Oct. 24, 1933.  O. U. ZERK  1,931,973
GREASE FEEDING DEVICE
Filed Nov. 9, 1929    3 Sheets-Sheet 1
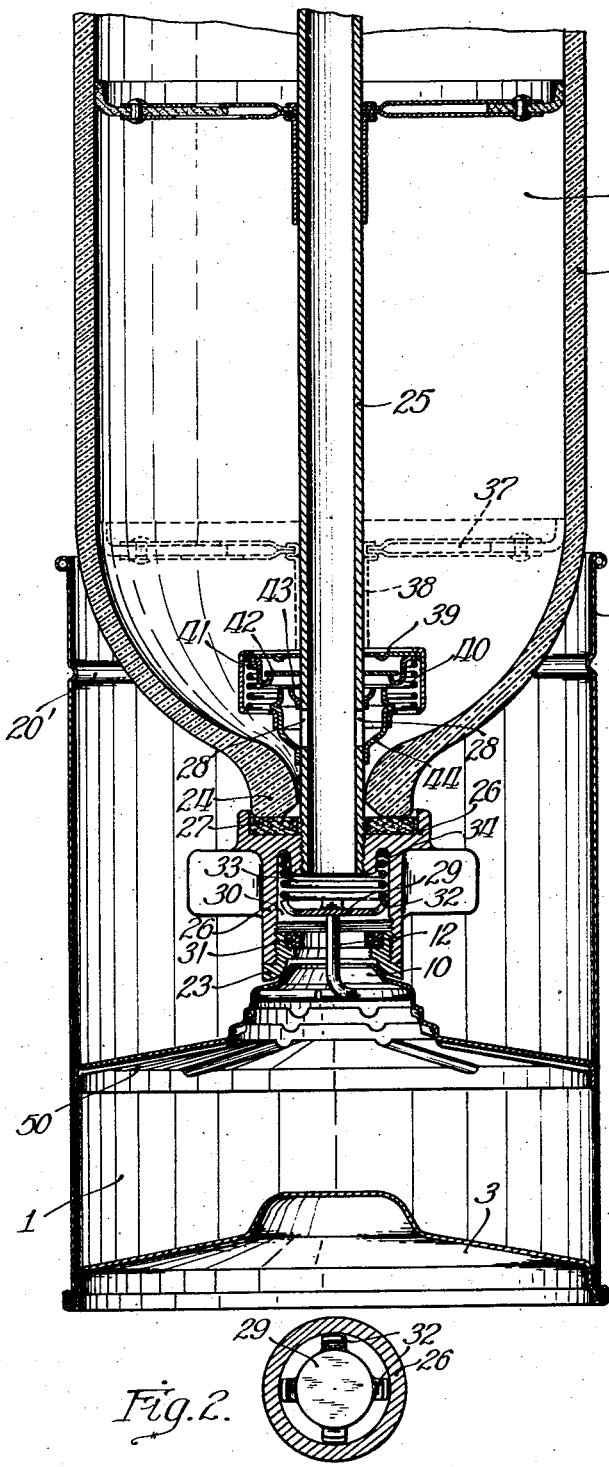
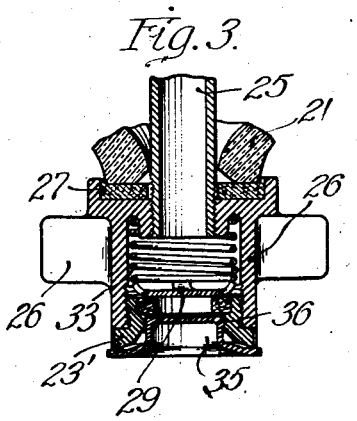
INVENTOR
Oscar U. Zerk,
By Slough & Canfield
ATTORNEYS Oct. 24, 1933.   O. U. ZERK   1,931,973
GREASE FEEDING DEVICE
Filed Nov. 9, 1929   3 Sheets-Sheet 2
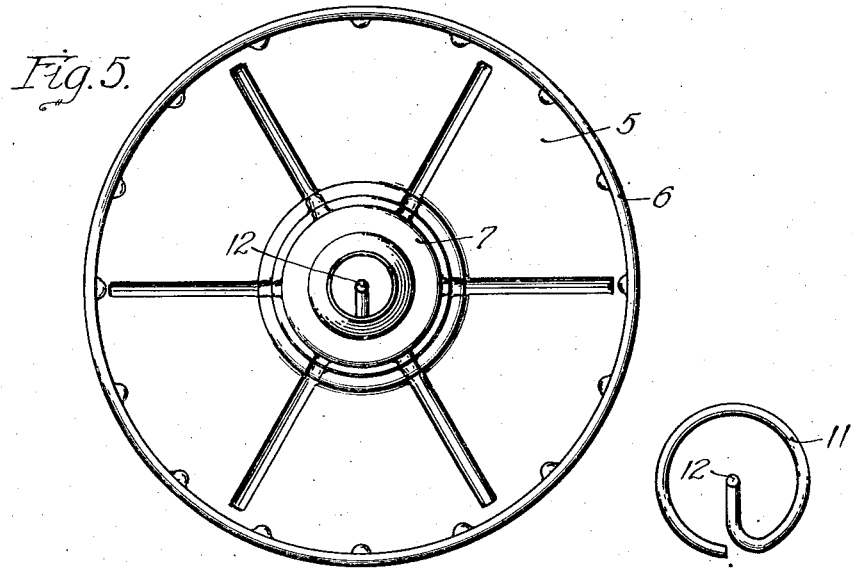
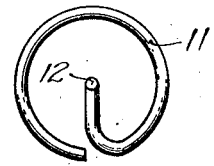
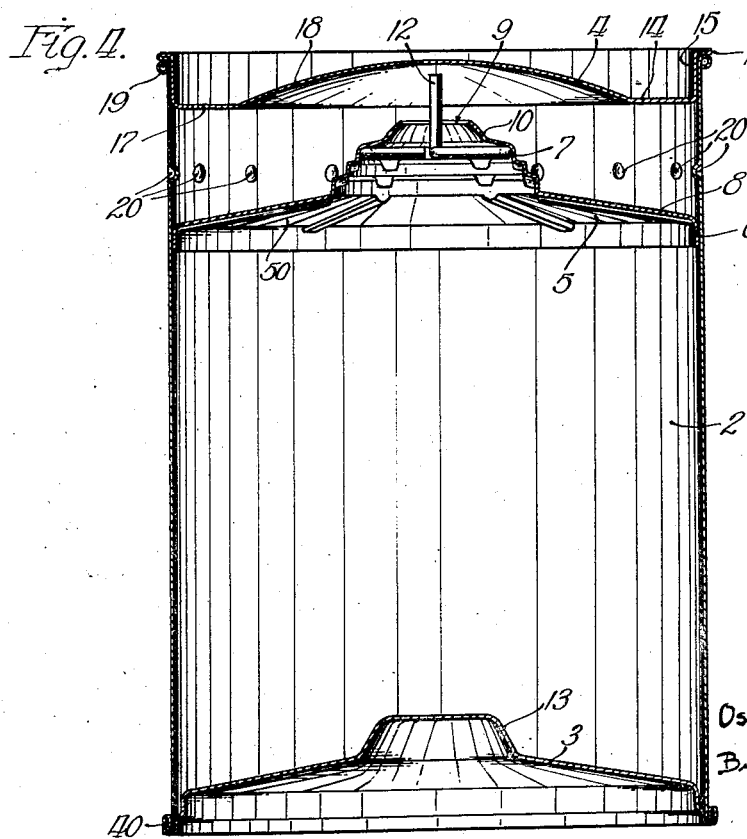
INVENTOR
Oscar. U. Zerk,
By Slough+Canfield
ATTORNEYS

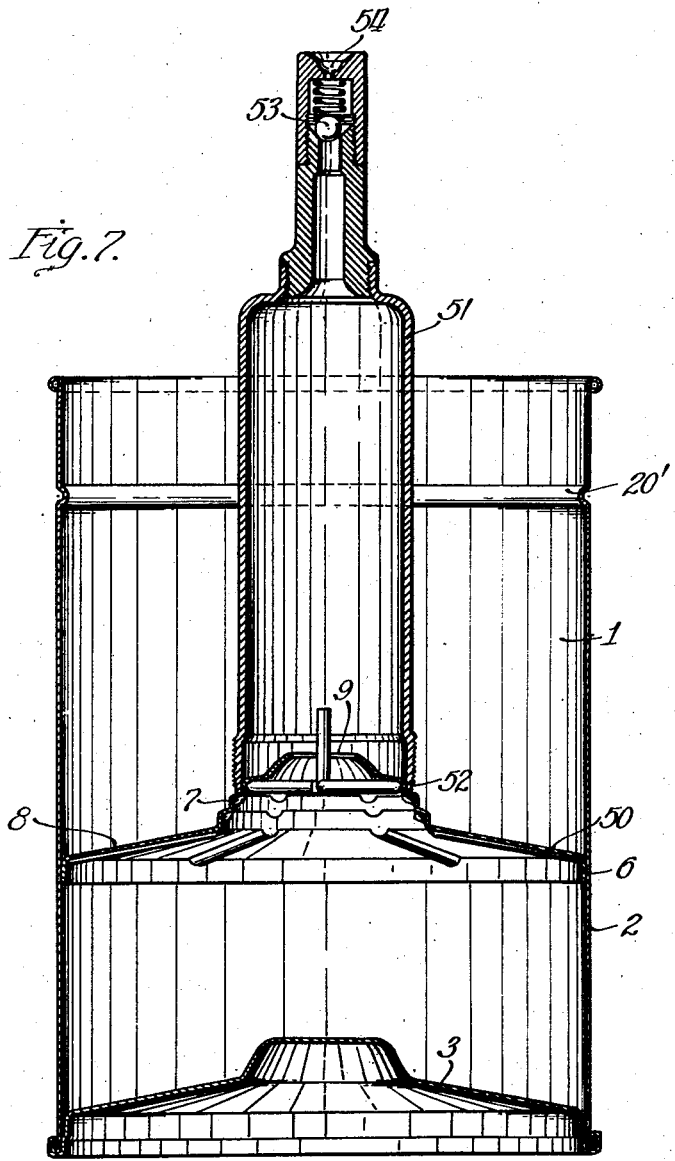

Patented Oct. 24, 1933

1,931,973

UNITED STATES PATENT OFFICE 1,931,973

GREASE-FEEDING DEVICE

Oscar U. Zerk, Chicago, Ill., assignor to Alemite Corporation, Chicago, Ill., a corporation of Delaware Application November 9, 1929. Serial No. 406,114

7 Claims. (Cl. 221—47.5)

My invention relates to improvements in grease feeding devices, and relates more particularly to grease cans.

Grease cans have heretofore been used very commonly for the filling of grease gun barrels. Because these grease gun barrels are commonly long and slender, it is important to use means whereby the air contained in the grease gun barrel may, largely, be expelled by the grease fed into the grease gun barrel, whereby such air will not prevent the feeding of new grease. To facilitate the movement of grease in the barrel, slidable plungers are commonly used in said grease cans, having a central aperture and air vent grooves in the slidable plunger. The grease gun barrel with an open end facing the grease can is then placed against the center of the slidable plunger, and when pressure is applied against the grease gun barrel, the grease from the can moves upwards through the central opening in the slidable plunger into the empty grease gun barrel.

Because the central hole in the slidable plunger is required to be smaller than the inside diameter of the smallest barrel, this hole is necessarily small relative to the inside diameter of the largest grease gun barrel to be charged by the grease can.

Due to the fact that the height of the circumferential portion of the slidable plunger in the grease can is always relatively large in comparison with the diameter of the slidable plunger, the pressure against the slidable plunger must be applied centrally, otherwise the plunger would tilt and the grease below the slidable plunger would be pressed upwardly past the two tilted sides of the plunger.

To prevent a plunger from tilting, the outside portion of the plunger would require to be made long, which is impracticable, because the can then being at least twice as long as those commonly used, and therefore would be ungainly in appearance and expensive to make. Should the circumferential portion of the plunger be of medium length, such a plunger would bind. The placement of a central guide in the plunger would result in a partial discharge of grease from the can because the central guide pin would touch the bottom of the grease gun barrel, which is usually shorter than the length of the grease can.

I, therefore, provide a novel grease can having an improved follower which is so designed that grease gun barrels of various inside diameters are self-centering in relation to the center of the piston follower of the grease can.

Grease cans with piston followers have so far only been used for the filling of grease guns, which are portable lubricators.

In my copending application, Case 9, on a so-called Multiplex system of automatic lubrication, Serial No. 397,337, filed October 4, 1929, I have described a novel system of filling permanently attached grease reservoirs with grease without detaching the reservoir from the rest of the centralized lubricating apparatus. While formerly a portable grease gun barrel has been pressed against the relatively stationary can, stationary during the filling operation, I have conceived the idea of pressing a can against a relatively stationary lubricant reservoir to charge it with lubricant.

Such reservoirs are provided with a passage through which the grease may be forced into the reservoir, and with spring pressed or other check valve means to prevent grease from escaping from the grease reservoir, and dirt from entering the grease reservoir, during use of the reservoir.

The smaller the grease passage through which grease is fed to the reservoir, and the stronger the check valve spring, the greater the pressure which must be applied in feeding grease to the reservoir. This can only be accomplished with elaborate and expensive medium pressure pump means. In the present invention I aim to do away with expensive pump means to fill a relatively stationary grease reservoir and to use a grease can with a slidable plunger in place of said pump means.

The pressure exerted against the slidable plunger of the grease can being relatively low, and the area of the slidable plunger of the grease being relatively large, the pressure per square inch exerted by the grease forced from the grease can, therefore, may be exceedingly low, such as, for instance, about one pound per square inch. Due to this exceedingly low pressure, I reduce the friction of the grease in the reservoir opening to a minimum by making the feeding channel relatively large and relatively short, and to prevent the spring operated check valve in the inlet of the lubricant reservoir from exerting any counter pressure to the incoming grease fed at very low pressure, I employ means connected with the grease can to open this check valve by the direct pressure of the operator instead of by the fluid pressure set up by the piston follower of the grease can.

Lubricant containers for grease and oil are entirely differently designed because oil can be poured out of such oil containers or bottles. Such containers have usually relatively small openings which can easily be closed and due to this easy and clean way of closing, it is always closed thus preventing grit or dust from entering the oil container, but even if grit does enter this container, it will always settle to the bottom of the oil.

With grease, however, an entirely different situation prevails. While grease could be forced into a container through a small opening, it cannot readily be removed therefrom except through a large opening. A large cap required for such large openings, becoming greasy, is difficult to handle and its replacement is often neglected.

Due to its greasy condition grit and dust in the air blown into the open can will stick to the outside surface of the grease and will, therefore, be emptied into the lubricant reservoir at the next filling operation.

Since dirt in grease is very undesirable in centralized lubricating systems, because it clogs up the relatively small resistance channels in resistance units, and because it may clog the bearings, I have provided for the employment of grease cans having a capacity substantially the same as the capacity of the grease reservoir, which has to be filled by the grease can so that substantially no grease will be left in the grease can after it has been emptied into the relatively stationary grease reservoir. The grease can will, therefore, not be used over again.

An object of my invention, therefore, is to provide an improved grease can adapted for the filling of the relatively stationary grease reservoir of a centralized lubricating system.

Another object of my invention is to provide improved means for centering the grease gun barrel, being supplied with lubricant from the grease can relative to the piston follower of said can.

Another object of my invention is to provide an improved lubricant supplying grease can having a dispensing outlet adapted to make lubricant communicating engagement with any of a number of inlet openings of different sizes for lubricating mechanisms.

Another object of my invention is to provide an improved lubricating mechanism comprising a relatively stationary lubricant reservoir and a can for supplying grease thereto of substantially the same volumetric capacity as the reservoir whereby the reservoir may be completely filled with lubricant at a single dispensing operation of the can.

Another object of my invention is to provide an improved grease can adapted to communicate lubricant to a variety of receptacles of widely different sizes.

Another object of my invention is to provide for supplying a lubricant receptacle with grease in such a way that dirt and dust will not be introduced into the grease during the filling operation.

Another object of my invention is in one modification to provide means for effecting the operation of the check-valve of a lubricant reservoir by pressure exerted manually by the operator, whereby the disadvantages of effecting operation of such a valve, by fluid pressure, may be avoided.

Another object of my invention is to provide improved means for filling a relatively stationary lubricant reservoir of a centralized lubricating system by a grease can movably telescoped thereover.

Another object of my invention is to provide for the manual operation of a fluid pressure operated valve of a lubricant reservoir by interengagement of operating parts of said valve with parts of a lubricant dispensing vessel, adapted for temporary association therewith to supply lubricant to the reservoir.

Another object of my invention is to make a substantially leakproof contact between the reservoir opening and the piston follower from a plurality of different angular directions.

Other objects of my invention and the invention itself will become more apparent by reference to the following description of an embodiment of my invention, and in which description reference will be had to the accompanying drawings illustrating the said embodiment.

Referring to the drawings:

Fig. 1 is a view in longitudinal medial section of a lubricant reservoir and a filling device therefor, which embody my invention.

Fig. 2 is a transverse section through the filling check-valve of the reservoir, shown in Fig. 1.

Fig. 3 is a fragment of the lubricant receiving end of the reservoir of Fig. 1, showing the valve thereof in closed position.

Fig. 4 is a longitudinal medial sectional view of the lubricant supply can embodying the principles of my invention, shown in Fig. 1.

Fig. 5 is a plan view of the can of Fig. 4.

Fig. 6 is a plan view of a wire valve unseating element for the can of Figs. 4 and 5.

Fig. 7 is a longitudinal medial sectional view corresponding to that of Fig. 1, but with the barrel of a lubricant gun shown in operative contact with the supply can of Figs. 4 and 5.

Referring now first to Figs. 4, 5 and 6, which illustrate the lubricant supply can, the embodiment illustrated comprises a receptacle having cylindrical side walls 2, a preferably reentrant bottom end wall 3, a removable top closure cap 4, preferably having an outwardly bowed central portion which is reentrant with respect to the border portions of the cap, and a follower generally shown at 5, which is adapted to be reciprocated within the side walls 2 of the container, longitudinally thereof.

The follower is provided with a tubular peripheral flange 6, a ribbed concave-convex centrally perforated cup-shaped central portion 7, and an intermediate ribbed portion 8. The purpose of the divergent ribs formed in the said intermediate annular portion 8 of the follower, is to stiffen the follower so as to cause it to resist longitudinal thrusts directed longitudinally of the container upon the stepped concavo-convex central portion 7 of the follower.

The said central portion of the follower forms a substantially spherical dispensing nozzle 10 centrally apertured at 9 to effect communication of lubricant through the follower from a plurality of different angular directions, as later described. By a series of annular steps forming shoulders of successively larger diameter, the nozzle portion 10 of the follower is supported on the inclined intermediate portion 5 of the follower.

As later related, the surfaces of said steps or shoulders are adapted for interchangeable engagement with the mouths of lubricant receiving reservoirs interchangeably telescoped over the nozzle 10, according to the size of mouth of the particular reservoir to be supplied with lubricant from the container 2.

A valve operating element in the form of a coil of wire 11, Fig. 6, provided with an upstanding axially disposed end 12, is resiliently constrained in position within the said cup-shaped central portion 7 of the follower, against the inner shoulder surface thereof, with the end 12 projecting axially through the nozzle opening 9.

The tubular flange 6 is disposed contiguously to the inner cylindrical walls 2 of the container, and is guided thereby during longitudinal movements of the follower relative to said cylindrical walls.

The bottom end wall 3 of the container is generally of such form as to permit the follower being telescoped thereover, the said end wall 3 being substantially reentrant and formed in two distinct portions, an outer portion being in the form of a relatively flat cone, the reentrant portion 13 being substantially cup-shaped and adapted to be telescopable within the stepped centrally apertured central portion of the follower, when the follower is reciprocated to the bottom end of the container, as shown.

By this construction the follower may closely approach the bottom wall 3 to minimize the clearance and the incidental waste of grease trapped therebetween when the follower is forced to its bottom position.

The closure cap 14 is provided with tubular lateral walls 15 and an outturned rim flange 16, and an end wall 17 having a reentrant central portion 18 of preferably substantially concavo-convex form. The outer surfaces of the laterally disposed tubular walls of the cap 14 are of such diameter as to make them fit snugly within the lateral walls 2 of the container, whereby the cap may be forced on to the container with its tubular walls telescoped therein and its outturned rim 16 engageable with the outwardly turned bead 19 of the tubular walls 2 of the container.

A plurality of laterally aligned inward projections 20 of the container side walls 2, are engageable by the follower upon a predetermined outward movement thereof, to restrain the follower from being removed from said container.

Now referring to Fig. 1, it will be observed that the lateral walls 2 of the can are of somewhat greater diameter than the lateral walls 21 of the reservoir 22, so that the can may be freely telescoped over said walls, being generally guided thereby to effect substantial alignment of the lubricant receiving mouth element 23 of the reservoir and dispensing nozzle 10 of the can follower.

The lubricant reservoir 22, illustrated in Fig. 1, is of special construction, being provided with glass lateral walls 21 suitably thickened at their converged lower or lubricant admission end 24, a metal tube 25 being projected axially from the upper end wall of the reservoir, not shown in the drawing, through the opening provided by the thickened end 24 of the reservoir, being screw threaded into a wing nut 26. The nut 26 carries a sealing gasket 27 in a recess of its upper face, for engagement with the annular lower end of the thickened converging reservoir walls 24, whereby a good lubricant sealing connection is established between the bottom opening of the glass casing 21 and the wing nut 26, to prevent flow of lubricant through the bottom end of the reservoir, except through the tube 25, via lateral apertures 28 of said tube, which effect communication between the interior of the reservoir 22 and the interior of the tube 25, as more fully described in my co-pending application, Serial No. 397,337, filed October 4, 1929 (Case 9), and to which reference may be had for a more complete description of certain parts and to the lubricating system with which the apparatus of my invention of the present application is adapted for association.

A check-valve 29 is provided within a valve chamber 30 of the wing nut 26, and adapted for seating upon an annular valve seat 31, which is pressed into a shouldered inner portion of the lubricant receiving mouth element 23.

The lubricant receiving mouth element 23 is in the form of a hollow screw having outwardly flared inner surfaces, a radial flange at one end and an exteriorally threaded tubular portion extending inwardly therefrom in screw threaded engagement with the interior of the wing nut, with the flange 23 engageable with the tubular end of the wing nut.

The inlet check valve 29 is in the form of a disc having a series of bent-up arms 32, which are guided in the bore of the nut 26 and adapted for engagement by a compression spring 33, the upper end of which is set in an annular recess 34, surrounding the upper threaded portion of the nut in which the tube 25 is screw threaded.

Fig. 3 illustrates the lubricant receiving elements of the reservoir 22 just described, except that the parts in Fig. 3 are illustrated in the positions normally assumed when the reservoir is disassociated from a can, such as that shown in Fig. 1, and except that a closure cap 35 is illustrated as being provided for the modified form of lubricant receiving mouth element 23', shown in Fig. 3, which is provided with special screw threads at 36, engageable with cooperating external threads of the cap 25. The other parts shown in Fig. 3 are like similar parts of Fig. 1.

When, as shown in Fig. 3, a closure cap 35 is used in addition to check valve 29, as a modification of the check valve mechanisms composed of elements 29, 31 and 33 may be left out, if so desired, in which case the form of coil 11 (Fig. 6) provided with an upstanding axially disposed end 12 attached to the piston follower 8 may be omitted.

Grease is packaged within the can, shown generally at 1, with the follower, shown generally at 50, taking its uppermost position against the inward projections 20, Fig. 4, or against the continuous annular inward projection 20', Fig. 1; Fig. 1, showing a variant form of this structural feature.

The grease is contained between the end wall 3 of the can and the follower 50 and within the cylindrical walls 2 of the can, and dispensed from the can through the follower mouth 9 when the follower is pressed toward the end wall 3 of the can, in the manner illustrated in Fig. 1.

Grease may be supplied to the can in various ways but preferably is supplied prior to the placement of the cover cap 14 and follower 50 therein, and, needless to say, before the forming of the inward projections 20 or the inwardly projecting annulus 20' of Fig. 1. After the predetermined amount of grease is placed in the can, first the follower is placed in position and then the follower retaining projections are provided and the cap 4 applied.

Or, the follower being first placed in the can, lubricant may be supplied through the nozzle opening 9 of the follower, under pressure, filling the space between the follower and the end wall 3 within the lateral walls 2, and the pressure of lubricant as it is supplied effects separation of the follower 50 and end wall 3, until the follower engages the projections 20 or 20', as the case may be.

A third method of filling the can consists in filling the can from the bottom end previous to placement of the bottom wall 3 thereon, and then applying the end wall 3 and interfolding the peripheral contiguous edge portions 40 of the end wall 3 and lateral walls 2, as shown.

In dispensing lubricant from the can, in the manner shown in Fig. 1, this is accomplished by telescoping the can upwardly over the lower end of the reservoir 22 after removal of any closure cap, such as that shown at 35, Fig. 3, and effecting engagement between a shoulder of the stepped cup-shaped portion 7 of the follower and an annular surface of the mouth element 23 of the reservoir.

Such relative placement of the parts will effect lifting of the valve 29 by the upwardly projecting end 12 of the valve operating element 11, Fig. 6.

The reservoir valve being opened, further upward pressure manually operated, telescoping the walls 2 of the can over the exterior glass walls 21 of the reservoir, will, because of the inner engagement of the coupler elements 23 and 10 of the reservoir and can follower respectively, effect a downward pressure on the follower which will gradually be moved from its uppermost position, substantially as shown in Fig. 4, through an intermediate position substantially as shown in Fig. 1, to its ultimate position wherein the follower is superposed closely contiguously to the end wall 3 of the can.

In the latter position all of the grease will have been displaced by the act of pressing the end wall 3 upwardly with the can side walls 2 to its position contiguous to the follower 50, displacing the lubricant contained between the end wall 3 and the follower, through the substantially spherical nozzle 10, past the valve 29, and into reservoir through the apertures 28 of the tube 25.

This will effect a lifting of the piston follower 37, which is guided by a sleeve 38 rigidly secured to its center on the tube 25, from the dotted line position to the solid line position both shown in Fig. 1.

Lubricant may now be dispensed from the reservoir, being drawn from the upper end of the tube 25 by a grease pump, not shown in my present application but illustrated and described in connection therewith in the above identified parent application, of which this is a division.

As grease is drawn from the reservoir through the tube 25, the descending follower 37, making engagement with the annular disc 39, will depress the disc and the annulus 41 over which the disc 39 is superposed against the pressure of the spring 40.

An annular disc 42 of empire cloth or the like, constituting the valve, will in this way be lowered to seating engagement with the concentric respectively short and long tubular elements 43 and 44, which are rigidly affixed to the tube 25 to close the valve passage between said tubular elements, and which extends to the apertures 28 of the tube 25, to prevent air being drawn through said passage and said apertures from the reservoir 22 into the tube 25, after the supply of grease in the reservoir is substantially exhausted.

The valve mechanism and structural elements above described relating to the reservoir 22, form no part of the subject matter claimed in my present application, which relates chiefly to the can for supplying grease to the reservoir and the cooperative elements of the can and the reservoir operable when grease is supplied to the reservoir.

Referring now to Fig. 7, the parts of the can are substantially the same as that illustrated in Figs. 4 and 5, except that, as previously noted, a continuous annular inward projection 20' is substituted for the plurality of inward projections 20 of the foregoing form, but in both cases the structural parts operate in the same way.

Fig. 7 illustrates the application of the can 1 to the filling of a grease gun barrel, shown at 51, which is of considerable smaller diameter than the reservoir 22 of Fig. 1, but whose lubricant receiving end 52 provides a mouth opening which is greater in diameter and of different form than that provided by the element 23 for the reservoir 22.

In such a case the gun barrel 51 is filled with lubricant by manually pressing the gun on to the follower 50, the diameter of its mouth end 52 being accommodated by one of the successive shoulders of the portion 7 of the follower, which is provided with a plurality of successive steps of successively greater diameter proceeding toward the intermediate portion 8 of the follower.

The large open end of the can being, therefore, pressed against the central portion of the follower, it will be guided to position by the stepped portions of smaller diameter to engagement with a step whose peripheral portion is of larger diameter than the mouth of the barrel and being so guided and centered, manual pressure exerted on the barrel 51 of the gun will effect movement of the follower 50 toward the end wall 3 of the container and substantially sealing engagement being had by the peripheral flange 6 of the follower, with the lateral walls 2 of the container, lubricant will be expressed from between the follower and said end wall through its mouth 9 into the barrel of the gun.

Air will escape from the gun through the check-valve 53 and the operator will know that the gun is completely filled when grease instead of air starts to flow from the gun nozzle 54.

Having thus described my invention in a certain embodiment, and having certain illustrated modifications, I am aware that my invention may be embodied in lubricant containers whose structure departs more or less widely from those illustrated and described herein, but without departing from the spirit of my invention.

I claim:

1. In combination, a lubricant reservoir having a check valved inlet at its bottom, a contact coupling adjacent said check valved inlet, a unit package of lubricant comprising a collapsible container having a cooperating contact coupling and having a stud for opening the check valve of the inlet when said coupling members are brought into engagement, said collapsible container being adapted to discharge its entire contents into the reservoir upon a single stroke to accomplish filling of the reservoir.

2. In combination, a lubricant reservoir having a check valved inlet at its bottom, a contact coupling adjacent said check valved inlet, a unit package of lubricant comprising a collapsible container having a cooperating contact coupling and having a stud for opening the check valved inlet when said coupling members are brought into engagement, said collapsible container being adapted to accomplish filling of the reservoir, said container comprising a can having a sliding plunger, the can telescoping on the outside of the reservoir during the filling operation.

3. In combination, a lubricant reservoir, a lubricant inlet therefor, a check-valve for the inlet, and a unit package of lubricant comprising a collapsible container, said container having a dispensing mouth element engageable with the mouth of said inlet and adapted to make substantially leakproof connection therewith by manual pressure exerted by said container against the inlet, and mechanical means associated with said container adapted to be projected within the inlet when the inlet and container are brought into operative association to mechanically open the valve for dispensing the entire lubricant content from the container to the reservoir upon a single manual movement.

4. In combination, a lubricant dispensing reservoir having a tubular lubricant receiving mouth, a check-valve disposed in the reservoir for closing the mouth passage, a unit package for grease, comprising a barrel closed at an end, and dispensing means therefor comprising a piston follower, a centrally disposed outwardly dished perforated nozzle supported thereby, said nozzle having a stepped exterior surface, engageable with the mouth of said reservoir, and a valve engaging element supported by said follower adapted upon engagement of said reservoir mouth with said container nozzle to unseat the said valve.

5. In combination a lubricant container having fixed and movable end closure members with correspondingly disposed central portions, said movable end closure member having an opening therein, a lubricant dispensing reservoir having a lubricant-receiving opening, a check valve in said lubricant-receiving opening, means for positively opening said valve when the opening in the lubricant dispensing member is presented to the opening in the lubricant container, means for aligning the opening in the container and the opening in the reservoir, said movable end closure member movable toward the fixed end closure member upon manually forcing the lubricant container into contact with the movable end closure member, the correspondingly disposed portions of the end closure member being brought into registry upon further movement to cause substantially the entire contents of the lubricant container to flow into the lubricant reservoir.

6. In combination, a lubricant container having a fixed end wall and a piston member manually movable in said container, said wall and said piston member having correspondingly disposed portions, said piston member having a plurality of substantially frusto-conical portions and a lubricant dispensing opening centrally thereof, a lubricant dispensing reservoir, a lubricant receiving nozzle for said lubricant dispensing reservoir, said piston member being movable toward said fixed end wall when said nozzle is presented to said piston over the opening therein and forced downwardly, the correspondingly disposed portions of the piston member and the end wall being movable into registry whereby substantially the entire contents of the container may be forced into the reservoir.

7. A lubricant container having a piston member manually movable therein, said piston member having an opening and having a plurality of substantially frusto-conical portions, a lubricant dispensing member having a lubricant receiving nozzle, valve means in said nozzle, means associated with said container for positively opening said valve when said nozzle is presented to said opening, said frusto-conical portions comprising means for aligning the opening in the piston member with lubricant receiving nozzles of various size.

OSCAR U. ZERK.